United States Patent
Ahmad et al.

(10) Patent No.: US 12,238,586 B2
(45) Date of Patent: Feb. 25, 2025

(54) METHODS AND DEVICES TO DETERMINE THE QUALITY OF SERVICE MECHANISMS FOR VEHICLE-TO-EVERYTHING MOBILE DEVICE COMMUNICATIONS

(71) Applicant: InterDigital Patent Holdings, Inc., Wilmington, DE (US)

(72) Inventors: Saad Ahmad, Montreal (CA); Khalid Anwar, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/962,876

(22) Filed: Oct. 10, 2022

(65) Prior Publication Data
US 2023/0035965 A1   Feb. 2, 2023

Related U.S. Application Data

(63) Continuation of application No. 16/970,194, filed as application No. PCT/US2019/018306 on Feb. 15, 2019, now Pat. No. 11,510,108.

(Continued)

(51) Int. Cl.
*H04W 28/24* (2009.01)
*H04L 67/61* (2022.01)
(Continued)

(52) U.S. Cl.
CPC .......... *H04W 28/24* (2013.01); *H04W 4/025* (2013.01); *H04W 4/06* (2013.01)

(58) Field of Classification Search
CPC ....... H04W 28/24; H04W 4/025; H04W 4/06; H04W 4/40; H04W 28/0268; H04W 92/18; H04L 67/322; H04L 67/61
(Continued)

(56) References Cited

U.S. PATENT DOCUMENTS 10,575,335 B2   2/2020   Lee et al.
11,510,108 B2   11/2022  Ahmad et al.
(Continued)

FOREIGN PATENT DOCUMENTS

CN   103190125 A   7/2013
CN   107211345 A   9/2017
(Continued)

OTHER PUBLICATIONS

Fifth Generation Communication Automotive Research and Innovation, "Deliverable 4.1; Initial Design of 5G V2X system level architecture and security framework," Version 1.0 (Apr. 30, 2018).
(Continued)

*Primary Examiner* — Golam Sorowar
(74) *Attorney, Agent, or Firm* — Flaster Greenberg P.C.

(57) ABSTRACT

A method performed by a WTRU may comprise determining application layer information and receiving QoS policy configuration information. A QoS mechanism may be determined based on the application layer information and the received QoS policy configuration information. A QoS value applicable to the determined QoS mechanism may then be determined for a data packet. Subsequently, the determined QoS value may be transmitted to another WTRU over a PC5 interface, with or without the data packet. The QoS mechanism may be determined as one of a PPPP mechanism or a QFI mechanism. The QoS policy configuration information may be received via a gNB. In an embodiment, the application layer information may include an application identifier, a PSID or an ITS-AID. The QoS policy configuration information may indicate a mapping of V2X application IDs to respective QoS mechanisms.

12 Claims, 12 Drawing Sheets

Related U.S. Application Data

(60) Provisional application No. 62/717,421, filed on Aug. 10, 2018, provisional application No. 62/710,565, filed on Feb. 16, 2018.

(51) Int. Cl.
 *H04W 4/02* (2018.01)
 *H04W 4/06* (2009.01)
 *H04W 4/40* (2018.01)
 *H04W 28/02* (2009.01)
 *H04W 92/18* (2009.01)

(58) Field of Classification Search
 USPC .......................................................... 370/329
 See application file for complete search history.

(56) References Cited

U.S. PATENT DOCUMENTS

| | | | | |
|---|---|---|---|---|
| 2003/0039237 | A1* | 2/2003 | Forslow | H04L 63/083 370/352 |
| 2012/0275323 | A1 | 11/2012 | Reznik et al. | |
| 2014/0066082 | A1* | 3/2014 | Anchan | H04W 48/02 455/452.1 |
| 2016/0381491 | A1 | 12/2016 | Watfa et al. | |
| 2017/0118617 | A1 | 4/2017 | Cai et al. | |
| 2017/0208016 | A1* | 7/2017 | Lehane | H04L 41/5054 |
| 2018/0027479 | A1 | 1/2018 | Ahmed et al. | |
| 2018/0159935 | A1 | 6/2018 | Cavalcanti et al. | |
| 2018/0235022 | A1 | 8/2018 | Wu et al. | |
| 2019/0394685 | A1* | 12/2019 | Sharma | H04W 36/0055 |

FOREIGN PATENT DOCUMENTS

| | | | | |
|---|---|---|---|---|
| EP | | 3244677 A1 | 11/2017 | |
| EP | | 3273634 A1 * | 1/2018 | ............. G06F 21/43 |
| WO | WO 2017/158515 A1 | | 9/2017 | |
| WO | WO 2017/172937 A1 | | 10/2017 | |
| WO | WO 2017/173072 A1 | | 10/2017 | |
| WO | WO 2017/173579 A1 | | 10/2017 | |

OTHER PUBLICATIONS

IEEE Standard for Information technology—Telecommunications and information exchange between systems—Local and metropolitan area networks - Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "Update to Key Issue # 4," SA WG2 Meeting #126, S2-182023, Montreal, Canada (Feb. 26-Mar. 2, 2018).

Qualcomm Incorporated et al., "eV2X QoS Support of PC5 communications," SA WG2 Meeting #128, S2-186990, Vilnius, Lithuania (Jul. 2-6, 2018).

Third Generation Partnership Project, "Technical Specification Group Radio Access Network NR Radio Resource Control (RRC) protocol specification (Release 15)," 3GPP TS 38.331 V15.0.0 (Dec. 2017).

Third Generation Partnership Project, "Technical Specification Group Radio Access Network NR Radio Resource Control (RRC) protocol specification (Release 15)," 3GPP TS 38.331 V15.4.0 (Dec. 2018).

Third Generation Partnership Project, "Technical Specification Group Services and System Aspects; Architecture enhancements for 5G System (5GS) to support Vehicle-to-Everything (V2X) services (Release 16)," 3GPP TS 23.287 V0.1.0 (Jan. 2019).

Third Generation Partnership Project, "Technical Specification Group Services and System Aspects; Architecture enhancements for V2X services (Release 14)," 3GPP TS 23.285 V14.5.0 (Dec. 2017).

Third Generation Partnership Project, "Technical Specification Group Services and System Aspects; Architecture enhancements for V2X services (Release 14)," 3GPP TS 23.285 V14.7.0 (Jun. 2018).

Third Generation Partnership Project, "Technical Specification Group Services and System Aspects; Architecture enhancements for V2X services (Release 15)," 3GPP TS 23.285 V15.2.0 (Dec. 2018).

Third Generation Partnership Project, "Technical Specification Group Services and System Aspects; Procedures for the 5G System; Stage 2 (Release 15)," 3GPP TS 23.502 V15.0.0 (Dec. 2017).

Third Generation Partnership Project, "Technical Specification Group Services and System Aspects; Procedures for the 5G System; Stage 2 (Release 15)," 3GPP TS 23.502 V15.2.0 (Jun. 2018).

Third Generation Partnership Project, "Technical Specification Group Services and System Aspects; Procedures for the 5G System; Stage 2 (Release 15)," 3GPP TS 23.502 V15.4.1 (Jan. 2019).

Third Generation Partnership Project, "Technical Specification Group Services and System Aspects; Study on architecture enhancements for EPS and 5G System to support advanced V2X services (Release 16)," 3GPP TR 23.786 V0.3.0 (Jan. 2018).

Third Generation Partnership Project, "Technical Specification Group Services and System Aspects; Study on architecture enhancements for EPS and 5G System to support advanced V2X services (Release 16)," 3GPP TR 23.786 V1.1.0 (Jan. 2019).

Third Generation Partnership Project, "Technical Specification Group Services and System Aspects; System Architecture for the 5G System; Stage 2 (Release 15)," 3GPP TS 23.501 V0.1.0 (Jan. 2017).

Third Generation Partnership Project, "Technical Specification Group Services and System Aspects; System Architecture for the 5G System; Stage 2 (Release 15)," 3GPP TS 23.501 V15.0.0 (Dec. 2017).

Third Generation Partnership Project, "Technical Specification Group Services and System Aspects; System Architecture for the 5G System; Stage 2 (Release 15)," 3GPP TS 23.501 V15.2.0 (Jun. 2018).

Third Generation Partnership Project, "Technical Specification Group Services and System Aspects; System Architecture for the 5G System; Stage 2 (Release 15)," 3GPP TS 23.501 V15.4.0 (Dec. 2018).

Third Generation Partnership Project, "Summary of email discussion on QoS framework", 3GPP TSG SA WG2 #116bis, S2-164759, Aug. 23, 2016, 16 pages.

Third Generation Partnership Project, "Possible additional agreements on QoS framework", 3GPP TSG SA WG2 #116bis, S2-164794, Aug. 23, 2016, 2 pages.

* cited by examiner

METHODS AND DEVICES TO DETERMINE THE QUALITY OF SERVICE MECHANISMS FOR VEHICLE-TO-EVERYTHING MOBILE DEVICE COMMUNICATIONS

CROSS-REFERENCE TO RELATED APPLICATIONS

This application is a continuation of U.S. Non-Provisional patent application Ser. No. 16/970,194, filed Aug. 14, 2020, which is the U.S. National Stage, under 35 U.S.C. § 371, of International Patent Application No. PCT/US2019/018306, filed Feb. 15, 2019, which claims the benefit of U.S. Provisional Patent Application No. 62/710,565, filed Feb. 16, 2018, and U.S. Provisional Patent Application No. 62/717,421, filed Aug. 10, 2018, the contents of which are incorporated herein by reference.

SUMMARY

A method performed by a wireless transmit/receive unit (WTRU) may comprise determining application layer information and receiving quality of service (QoS) policy configuration information. A QoS mechanism may be determined based on the application layer information and the received QoS policy configuration information. A QoS value applicable to the determined QoS mechanism may then be determined for a data packet. Subsequently, the determined QoS value may be transmitted to another WTRU over a PC5 interface, with or without the data packet. The QoS mechanism may be determined as one of a ProSe Per Packet Priority (PPPP) mechanism or a QoS Flow Indicator (QFI) mechanism. The QoS policy configuration information may be received via a next generation Node B (gNB). In an embodiment, the application layer information may include an application identifier, a provider service identifier (PSID) or an intelligent transport systems-application identifier (ITS-AID). In another embodiment, the application layer information may include a priority level, packet delay budget (PDB) or latency information corresponding to an application. The QoS policy configuration information may indicate a mapping of vehicle-to-everything (V2X) application identifiers (IDs) to respective QoS mechanisms.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
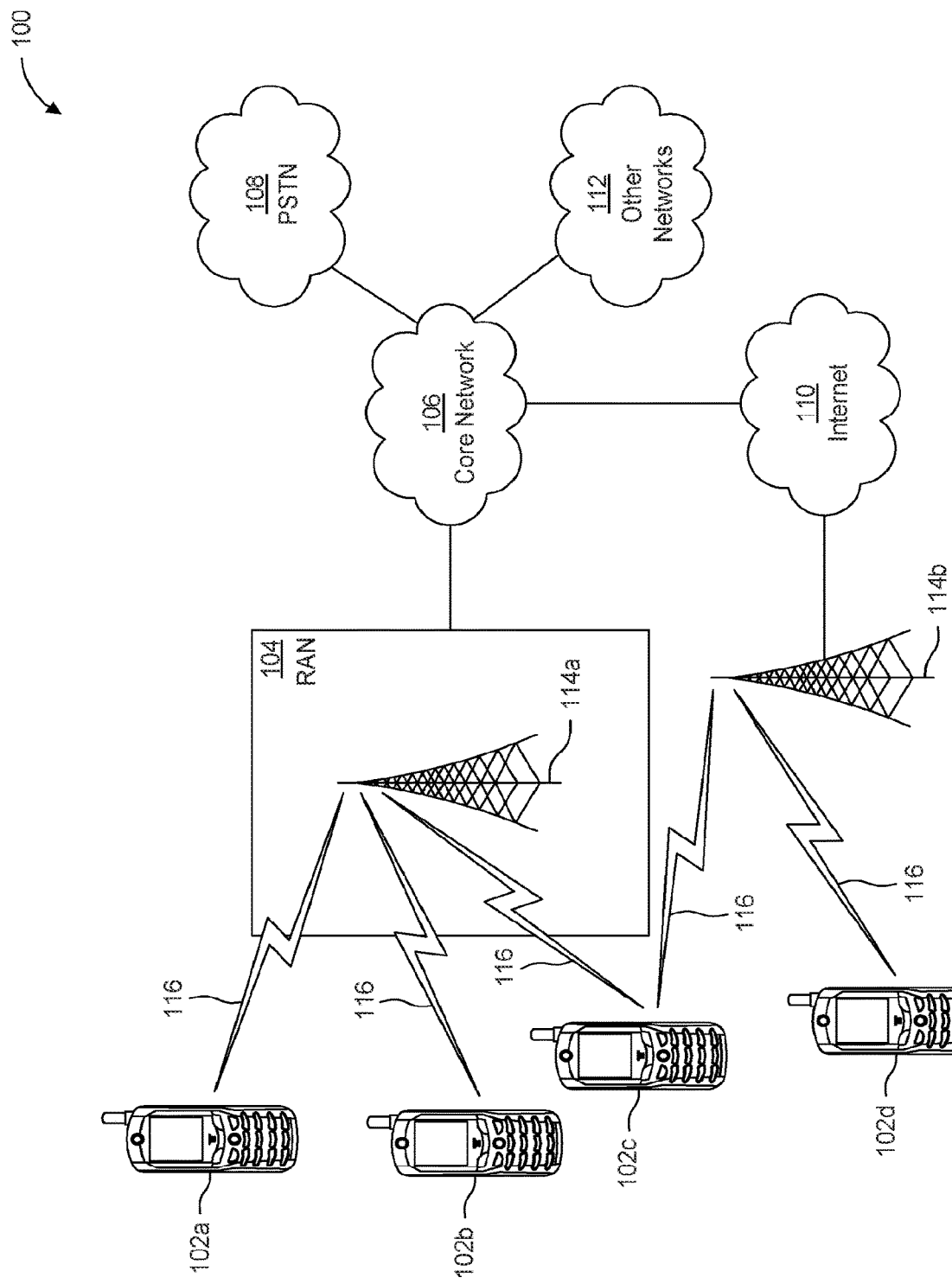
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
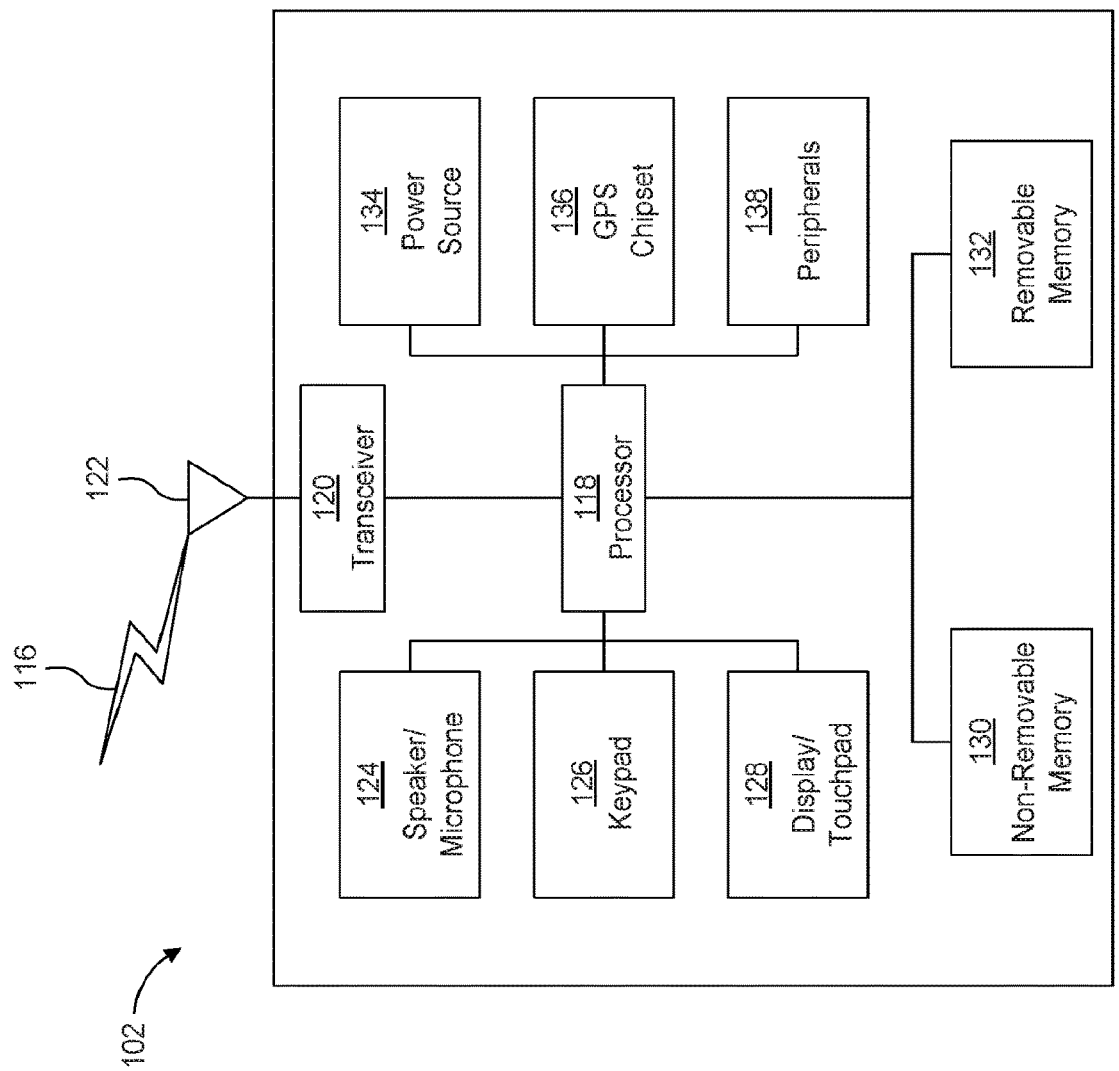
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
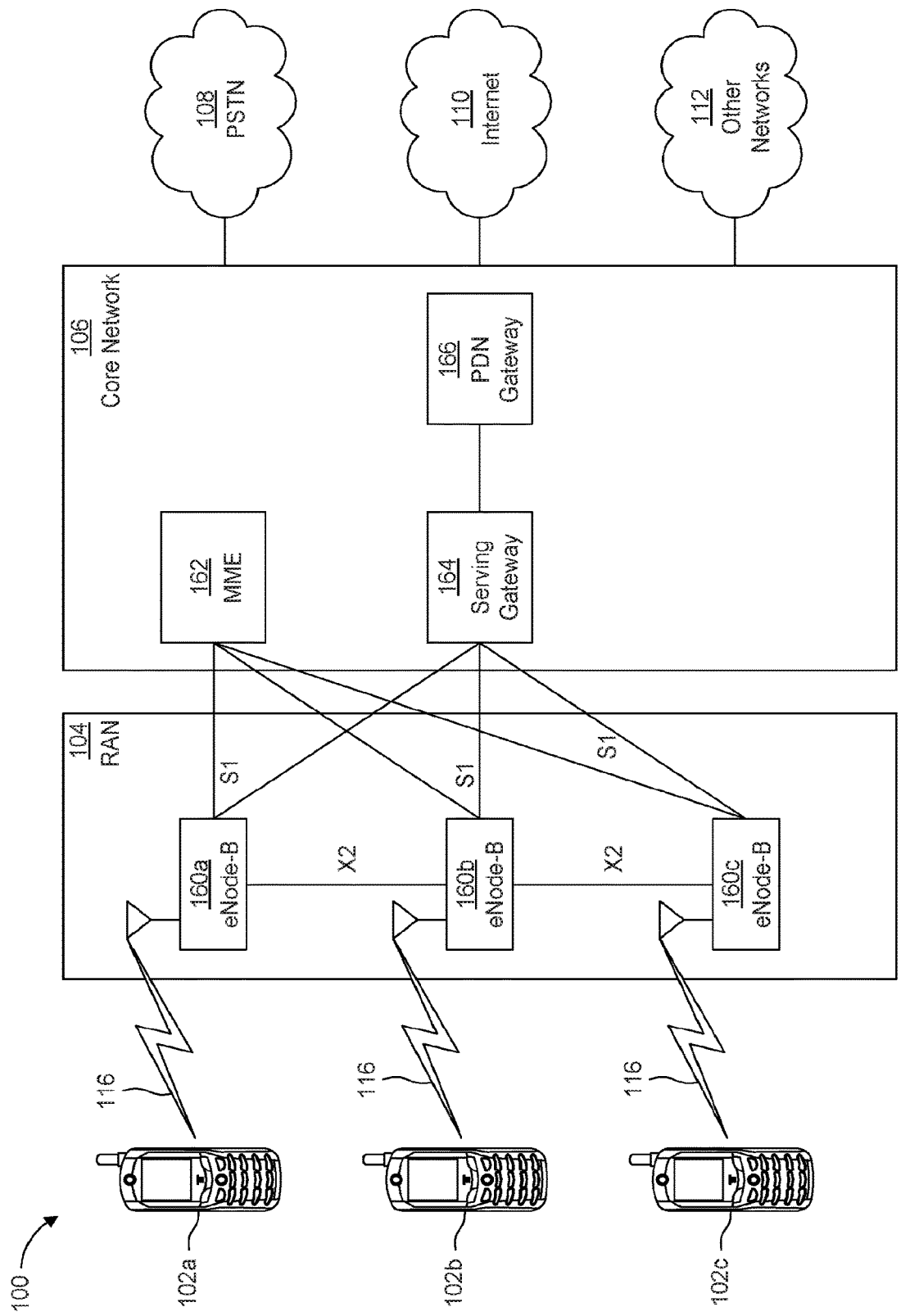
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
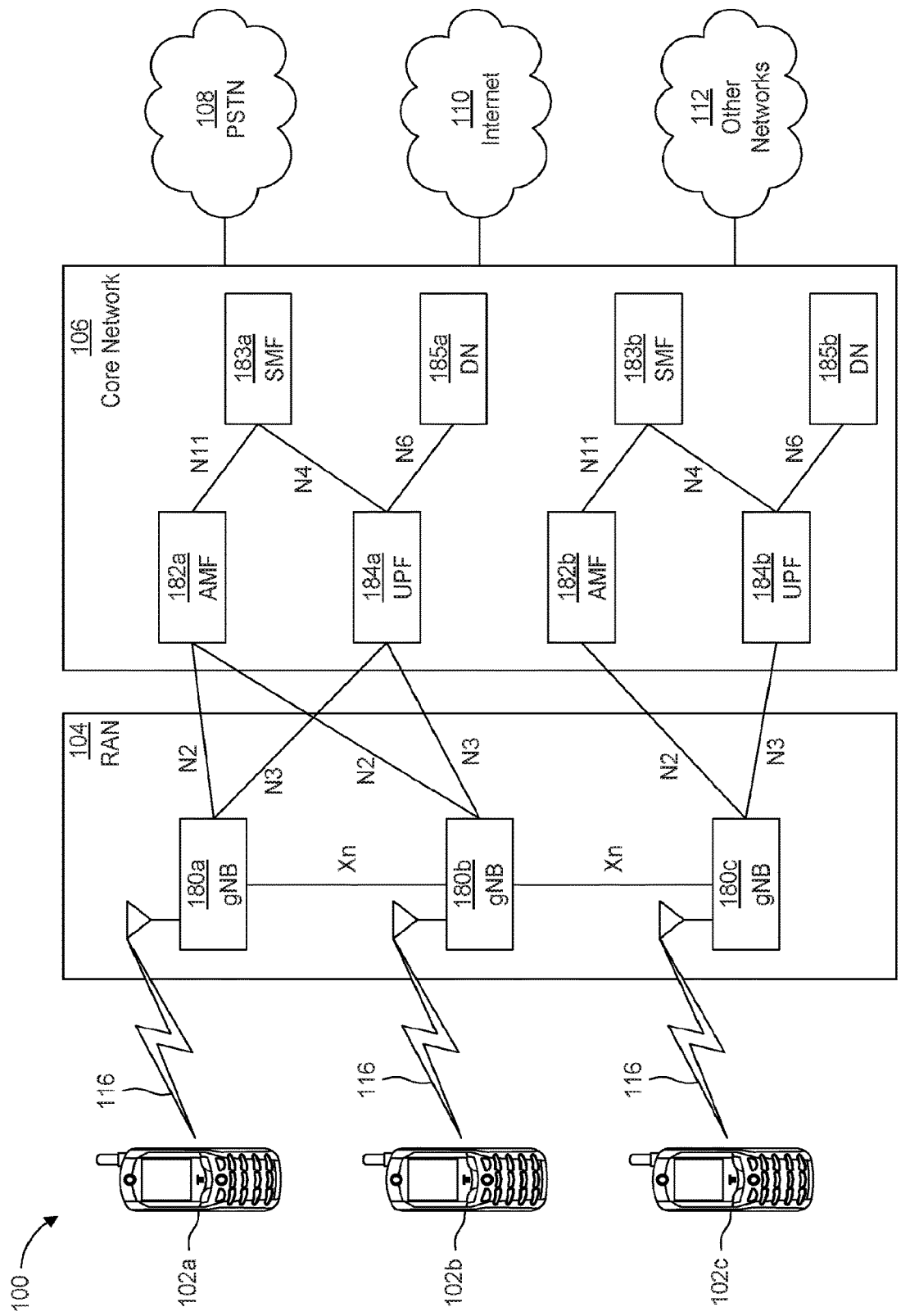
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

V2X communications may encompass one or more of vehicle-to-vehicle V2V communications, vehicle-to-pedestrian (V2P) communications, vehicle-to-infrastructure (V21) communications and vehicle-to-network (V2N) communications. V2V communications may allow for advanced driving assistance and other vehicle specific applications. V2P communications may include communications with people including adults, children being pushed in strollers, people using wheelchairs or other mobility devices, passengers including children embarking and disembarking from buses or trains and people riding bicycles or other self-propelled vehicles. V21 communications may include the exchange of critical safety and operational data between vehicles and highway infrastructure. Further, V2N communications may provide for the extensive use of cloud services.

V2X communication architectures have been developed for wireless communication systems, including those which use an evolved packet core (EPC). Next generation 5G systems may employ flow-based QoS marking. With flow-based QoS marking, the core network, in particular, the UPF, may mark a data packet with a QoS Flow Indicator (QFI) in the DL direction. QoS parameters, for example, a packet delay budget (PDB), packet error rate (PER), priority, may then be derived by a gNB, based on the QFI.

Instead of supporting a QFI based mechanism, some legacy architectures may rely on a Proximity Service (ProSe) Per Packet Priority (PPPP) mechanism which only provides 8 distinct priority levels, which may or may not be enough to support QoS differentiation for all application types. Therefore, one QoS mechanism, for example, a QFI-based mechanism may be employed for one particular service, while another QoS mechanism, for example, a PPPP mechanism may be used for another service or application. A WTRU may make a determination as to which QoS mechanism to employ, based on application layer information and information of a QoS policy configuration.

Figure 2:
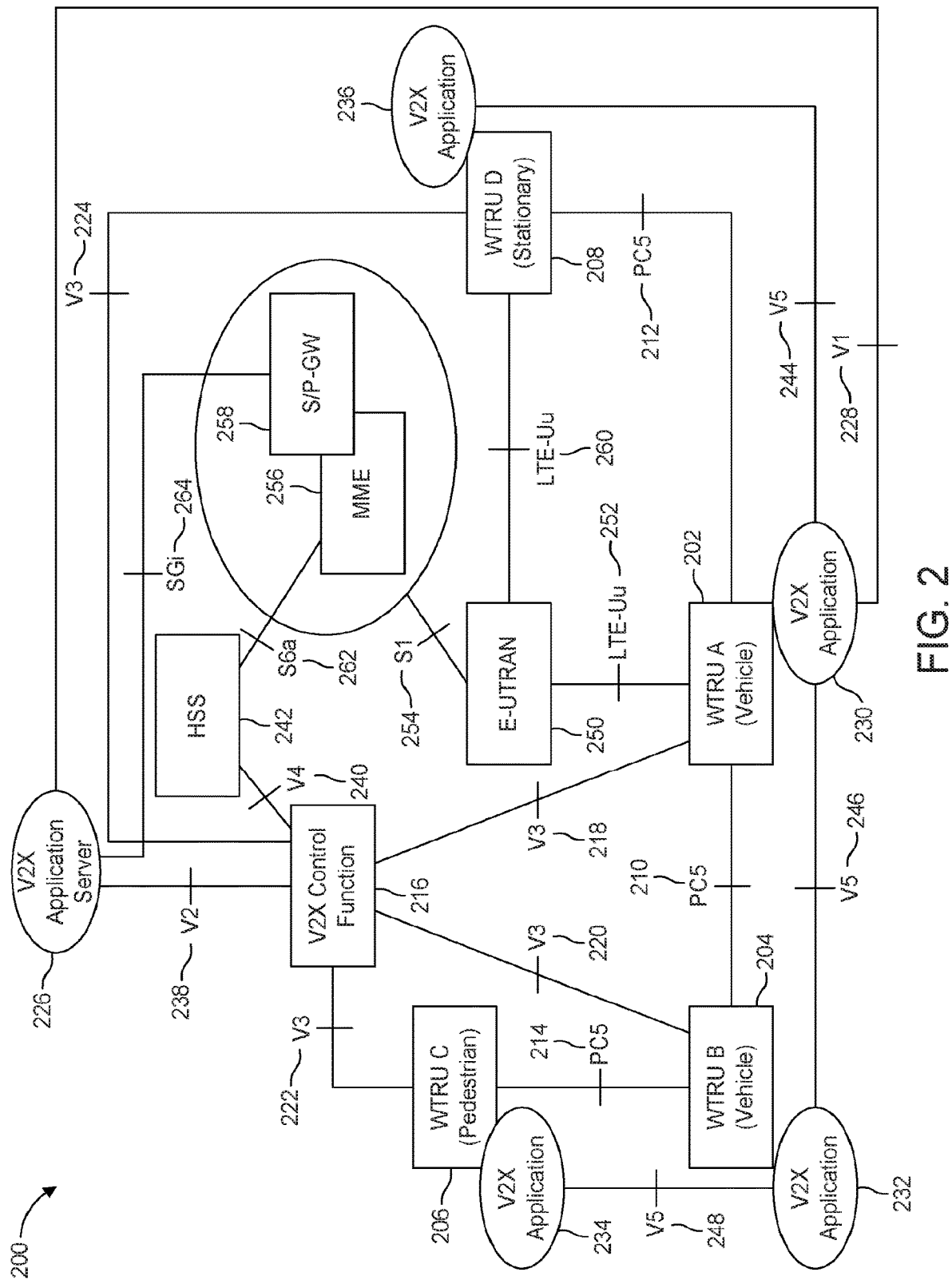
FIG. 2 is a system diagram illustrating an example vehicle-to-everything (V2X) architecture for use with an evolved packet core (EPC)

FIG. 2 is a system diagram illustrating an example vehicle-to-everything (V2X) architecture 200 for use with an evolved packet core (EPC). In the example shown in FIG. 2, V2X WTRUs 202-208 may communicate with each other over PC5 interfaces 210-214. A policy control function (PCF), for example, a V2X control function 216, may be employed for control purposes. The PCF may govern or enforce network behavior via V3 interfaces 218-224 to WTRUs 202-208. As shown in FIG. 2, WTRU A 202 is a vehicle, WTRU B 204 is also vehicle, WTRU C 206 is used by a pedestrian and WTRU D 208 is stationary. V3 interfaces 218-224 may be located between a V2X WTRU, for example V2X WTRUs 202-208 and the V2X control function 216 in the core network. The V2X control function 216 may provision each WTRU with any necessary parameters in order to use V2X communication. Also, the V2X control function 216 may be further used to provision WTRUs with public land mobile network (PLMN) specific parameters that allow the WTRUs to use V2X in a specific PLMN.

The reference point between the V2X application in the WTRU and in the V2X application server 226 may be referred to as a V1 reference point 228. For example, each WTRU 202-208 may have at least one V2X application 230-236 running in memory which relies on a V1 reference point 228 to reach a V2X application server 226. Application related information for V2X applications may be sent to the WTRU over the V1 interface 228 from the V2X application server 226 or other server. In the example shown, V2X application 230 is in communication with the V2X application server 226 via V1 228, however WTRUs 204-208 are not shown in communication over a V1 interface. Rather WTRUs 204-208 may communicate with the V2X application server via the V2X control function 216 and the V2 interface 238. Reference point V4 240 may be employed between the V2X Control Function 216 and a home subscriber server (HSS) 242. The reference points between the V2X applications 230-236 running on WTRUs 202-208 are referred to as V5 reference points 244-248.

WTRU A 202 may have a connection to a network such as an E-UTRAN 250 via an LTE-Uu reference point 252. The E-UTRAN 250 may, via reference point S1 254, interface with an MME 256 and S/P-GW 258. The E-UTRAN 250 may, via LTE-Uu interface 260, interface with WTRU D 208. V2X service S6a 262 may be used to download V2X Service related subscription information to the MME 256 during an E-UTRAN attach procedure or to inform that MME subscription information in the HSS 242 has changed. An SGi reference point 264 may connect the V2X application server 226 to the serving/packet gateway (S/P-GW) 258.

Figure 3:
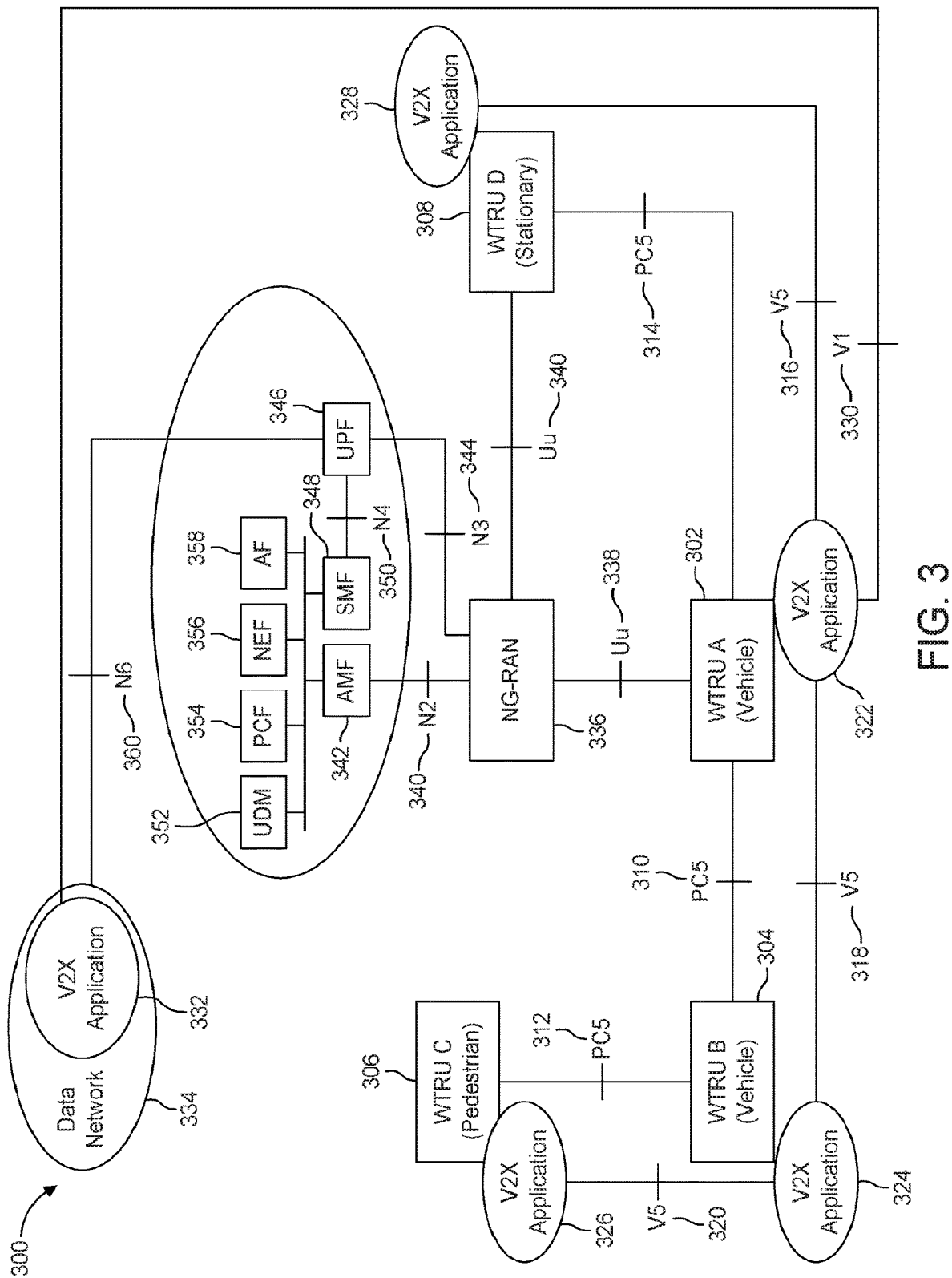
FIG. 3 is a system diagram illustrating an example V2X architecture in a fifth generation (5G) system.

FIG. 3 is a system diagram illustrating an example V2X architecture 300 in a 5G system. In this example, reference points V3 218-222 and V4 240 shown in the EPC V2X architecture 200 of FIG. 2, may no longer needed, as functions of these reference points may be handled by 5G CN (5GC) interfaces. A configuration of a WTRU using V3 may instead be handled over existing interfaces. For example, the configuration may be handled by a WTRU configuration update procedure performed over an N1 interface. An N1 interface may include a WTRU-AMF NAS interface (not shown in FIG. 3). Further, the reference point V4 240, between V2X Control Function 216 and HSS 242, as shown in FIG. 2, may not be needed in the example shown in FIG. 3. Functions of this reference point may also be handled using existing 5GC interfaces.

As shown in FIG. 3, WTRU A 302 is a vehicle, WTRU B 304 is a vehicle, WTRU C 306 may be a WTRU of a pedestrian and WTRU D 308 may be stationary. Each WTRU 302-308 may be in communication with each other via a PC5 interface 310-314 which may provide for QoS handling for V2X communication. In an EPC system, such as the architecture of FIG. 2, a ProSe Per Packet Priority (PPPP) mechanism may be used to differentiate QoS settings for various V2X messages. The application layer may set the PPPP for each V2X message when passing it to a lower layer for transmission. It should be noted that the mapping of application layer V2X message priority to PPPP may be configured on the WTRU. The setting of the PPPP value should reflect the latency required in both the WTRU and the eNB or gNB. For example, a low packet delay budget (PDB) may be mapped to a high PPPP value.

Reference point V5 316-320 may provide an interface between V2X applications 322-328 running on WTRUs 302-308. Reference point V1 330 may provide a reference point between V2X application 322 and V2X application 332, where one V2X application 332 exists on a data network 334. At least one of the WTRUs 302-302, for example, WTRU A 308 and WTRU D 308, may be coupled to the NG-RAN 336 via a Uu interface 338-340. NG-RAN 336 may have at least two reference points, reference point N2 340 to interface with the AMF 342 and N3 344 to interface with the UPF 346. UPF 346 and SMF 348 may be in communication via N4 reference point 350. UDM 352, PCF 354, NEF 356, and AF 358 may be in communication with the AMF 342 and SMF 348. UPF 346 may utilize the N6 reference point 360 for communication with the data network 334.

In a 5G system, such as the architecture shown in FIG. 3, a WTRU may support reflective QoS. Using a reflective QoS model, a WTRU may monitor one or more QoS flow identifiers of DL packets and apply a same, i.e. a reflective, mapping in the uplink direction. Further, in one or more 5G QoS models, a WTRU may derive QoS rules at the WTRU side, based on the received DL traffic. As a result, the WTRU may map UL user plane traffic to QoS flows without having the SMF provide QoS rules. Such an approach may be applicable for IP type and Ethernet type PDU sessions among others. There may be WTRUs which do not support reflective QoS. Hence, support of reflective QoS may be indicated to the network by the WTRU. Additionally, support for any other QoS mechanisms may be indicated to the network by the WTRU.

5G systems may employ a different QoS mechanism than those used by other radio access technologies. For example, the 5G QoS mechanism may be based on packet marking. The core network, for example, a UPF of a core network, may mark a packet with a QFI in the DL. One or more QoS parameters may be then derived by a base station, for example an eNB or gNB, based on the QFI. Example QoS parameters include one or more of a PDB, PER, priority and the like. For certain standardized QFIs or 5G QoS Indicators (5QIs), the eNode-B or gNB may be aware of the QoS parameters. However, the eNode-B or gNB may need to be made aware of QoS parameters if non-standardized QFIs are used. A QFI may indicate one of 63 or 64 different priority levels using an 6 bit indicator. For example, bit pattern 000000 may indicate no selected QFI while bit pattern 000001 may indicate a level 1 to 111111 indicating a level 63 QFI.

For certain V2X services in 5G, the existing PPPP mechanism with eight (8) priority levels may not be enough to support QoS differentiation. Certain enhancements may therefore be useful to allow the new QoS requirements of V2X traffic or other device to device type traffic to be conveyed from the application layer to the AS layer. Examples provided illustrate procedures performed by the WTRU to determine whether one or more additional QoS mechanisms are required. The examples further illustrate an application of an advanced 5G QoS differentiation mechanism for V2X communication. Such advanced 5G QoS differentiation may be applied over the PC5 interface.

There may be instances where the QoS profile over an established link between WTRUs is to be changed. Instead of arranging for the network to be involved in changing the QoS profile of the established link, reflective QoS may be employed by a target WTRU. Such an approach may enable lower overhead cost in terms of resource usage since the WTRUs of the established link may negotiate the QoS arrangement themselves. Hence, procedures may be used to enable reflective QoS over the PC5 interface.

In an example, the WTRU may receive QoS configuration information. For example, the 5G core network may provide the WTRU with QoS configuration information. Alternatively, the QoS configuration information may be received over a PC5 interface or other interface. In some examples, the 5G core network may be one or more of a PCF, a V2X control function or any other policy provisioning network function. The QoS configuration information may include the mapping for V2X application identifiers (IDs) to the QoS mechanism that may be applied to the packet of a particular V2X application. In some examples, the V2X application IDs may include one or more of a provider service identifier (PSID), an intelligent transport systems-application identifier (ITS-AID) and the like. An example of the applicability of this information may be that for an example PSID, for example, PSID 1, the WTRU may use a PPPP mechanism, while for packets of an application with PSID 2, the packets may be tagged with a QFI. This determination as to how to flag a packet with a QoS value, may be performed based on a look up table or other data structure.

The configuration information may also include information about the priority or QoS parameters to be applied for certain V2X applications or certain V2X application types. For example, the network may inform the WTRU that for PSID X, the WTRU should apply priority Y. In an embodiment, the network may inform the WTRU that for application type A, the WTRU should apply priority B.

Figure 4A:
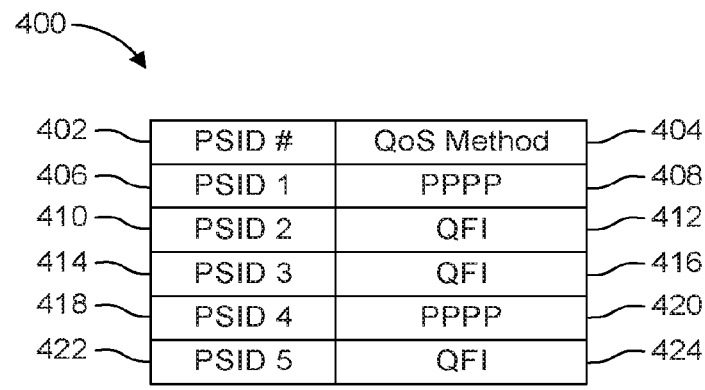
FIG. 4A is a table illustrating provider service identifiers (PSIDs) and corresponding QoS mechanisms.

FIG. 4A is a table 400 illustrating provider service identifiers (PSIDs) and corresponding QoS mechanisms. The table 400 may be organized based on a PSID #402 and may indicate a QoS mechanism 404 corresponding to the PSID #402. For example, PSID 1 406 should employ a PPPP mechanism 406; PSID 2 410 should employ a QFI mechanism 412; PSID 3 414 should employ a QFI mechanism 416; PSID 4 418 should employ a PPPP mechanism 420; and PSID 5 422 should employ a QFI mechanism 424.

Figure 4B:
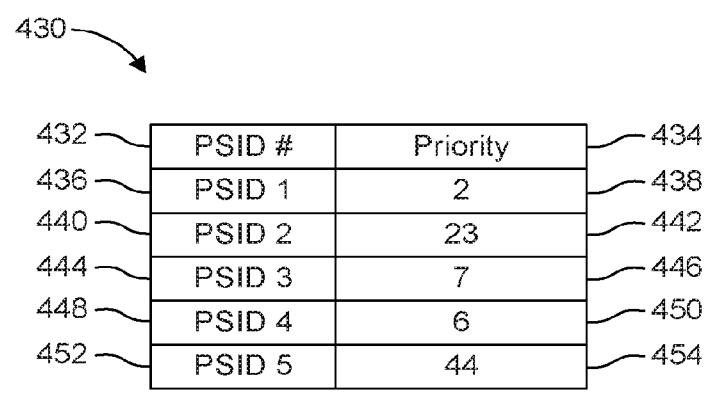
FIG. 4B is a table illustrating PSIDs and corresponding priority levels.

FIG. 4B is a table 430 illustrating PSIDs and corresponding priority levels. The table 430 may be organized based on a PSID #432 and may indicate a QoS value or priority 434 corresponding to the PSID #432. For example, PSID 1 436 should have a PPPP priority level of 2 438; PSID 2 440 should have a QFI priority level of 23 442; PSID 3 444 should have a QFI priority level of 7 446; PSID 4 448 should have a PPPP priority level of 6 450; and PSID 5 452 should have a QFI priority level of 44 454.

Information about the QoS treatment of various V2X packet types may be configured by the network. The network may include in the configuration information the type of QoS mechanism to be applied for IP packets and the type of QoS mechanism to be applied for non-IP packets. In an example, the WTRU may apply QFI to IP packets and PPPP to non-IP V2X messages.

For non-standardized QFI, the configuration information may include the QoS parameters, such as PDB, PER, priority and the like related to each non-standardized QFI value. This information may not be required for standardized QFIs since the WTRU may be already aware of the said QoS parameters.

Mapping of QFI and PPPP to different geographic areas may be included in the QoS configuration parameters. Certain QFIs may only be applied in certain geographic areas. Moreover, while in certain geographic areas, the WTRU may only be able apply either one of the QoS mechanisms, such as PPPP or QFI. Such information may therefore be provisioned to the WTRU via system information block (SIB), radio resource control (RRC) signaling and/or via a policy provisioning configuration message.

There may be two modes of V2X operation whereby either the WTRU scheduling is controlled by the RAN, for example, controlled by or through the gNB or eNode-B, or the WTRU autonomously schedules the transmission based on a configured resource pool, sensing and/or other methods. Different QoS mechanisms may be applied for UL transmissions in either of these modes. Thus, a WTRU may determine a QoS mechanism to apply based on a device to device communication mode. The network may therefore configure certain information to indicate to the WTRU which QFIs are used in the corresponding WTRU mode of operation as described. The network may further configure the WTRU as to whether to use PPPP or QFI during a time when the WTRU is operating in one of these modes. For example, the configuration may indicate that PPPP may only be applied in a WTRU autonomous resource selection mode and QFI may only be applied in a network scheduled mode or vice versa.

A V2X group of WTRUs involved in a group communication session may be identified by a Layer 2-group ID. In one embodiment, the WTRU configuration includes mapping information identifying whether PPPP should be applied for certain Layer2-group IDs or whether QFI should be applied for particular Layer 2-group IDs. This mapping information may even have further granularity insofar as specific QFIs may be applied for configured Layer2-groups IDs. For Group ID x, QFIs (1 to 5) may only be applied, as an example.

The network may also configure a V2X WTRU or group of V2X WTRUs with a maximum allowed bit rate for communication over the PC5 interface. The maximum allowed bit rate configuration information may be sent as part of a policy provisioning procedure or may be sent separately after the WTRU is configured for V2X communication.

One or more indications may be provided for determining whether reflective QoS should be applied by the WTRU. The indications may be provided to the WTRU from the network or another entity, if applicable. The reflective QoS provisioning information may include the applications, application identifiers or other identifiers, for example, PSIDs, ITS-AIDs, app IDs, or layer 2-group IDs to which the reflective QoS should be applicable. If this information is configured, the WTRU may apply the same QFI value it receives in a DL packet to an UL packet for such applications.

In an example, the WTRU may determine an appropriate QoS mechanism. The WTRU may make this determination based on application information and configured V2X QoS policies. The WTRU may determine a QoS value corresponding to the QoS mechanism and send the QoS value over the air. In examples, the QoS value may be a PPPP or a QFI. The WTRU may send the QoS value using a PC5 interface or an Uu interface.

In an example, a higher layer may receive a V2X packet from an application layer. In examples, the higher layer may include one or more of a ProSe layer, a V2X layer, an NAS layer and the like. The V2X packet passed down from the application layer to one or more of the higher layers may contain priority information. In an example, the priority information may be configured by a V2X application server. Additionally, upon reception of the packet, the higher layer(s) may be able to determine the application information of the V2X packet. In examples, the application information may include one or more of an App Id, a PSID, an ITS-AID and the like. Applications may have or may be associated with application information which includes QoS requirements. For example, vehicle platooning, advanced driving, extended sensors, and remote driving applications may each have an associated latency, data rate, reliability % or any other priority information. This information may prove useful when determining whether to apply a PPPP or QFI mechanism.

Based on the above mentioned information received from a V2X application packet, the higher layer may check the received configuration information to determine whether a PPPP or QFI mechanism should be applied to the packet. The information received in the policy provisioning may be used by the WTRU to determine the QoS mechanism, for example, used to determine whether PPPP or QFI is suited for the received packet. If a higher layer determines that PPPP is the appropriate QoS mechanism, the packet may then be passed on to the lower layers, for example, the Access Stratum (AS) layer, with the PPPP value derived from the received message priority information.

In an example, when one or more of the WTRU higher layers determines that a QFI marking may be appropriate for the QoS treatment of a packet, the one or more higher layers may then further determine the QFI value to be applied. The determination may be based on the information received from the application layer, the policy received from the network or both to make the QFI value decision. The higher layer(s) may also need information from the lower layers to check the geographic area the WTRU is located in or to check the capabilities and/or configuration of the WTRU. Different QoS values may be applied for the same packet in different geographic areas as per the policy. The WTRU higher layer may also use the received maximum bit rate information to derive the QFI value. The QFI values for the different packets from the same application may be adjusted by the WTRU based on the current bit rate. This may be to ensure that the WTRU PC5 does not exceed the configured threshold maximum bit rate value.

Once the QFI value is determined by the one or more higher layers, the packet may be marked with the QFI value and passed to the lower layers for appropriate QoS treatment. In one embodiment, a service data adaptation protocol (SDAP) layer may mark the QFI or PPPP and provide a mapping between a QoS flow and a data radio bearer. The lower layers of the WTRU may send the packet, including the QFI or PPPP value, over either the PC5 interface or to the RAN, for example, to or through the eNode-B or gNB, depending on the WTRU mode of operation.

Figure 5:
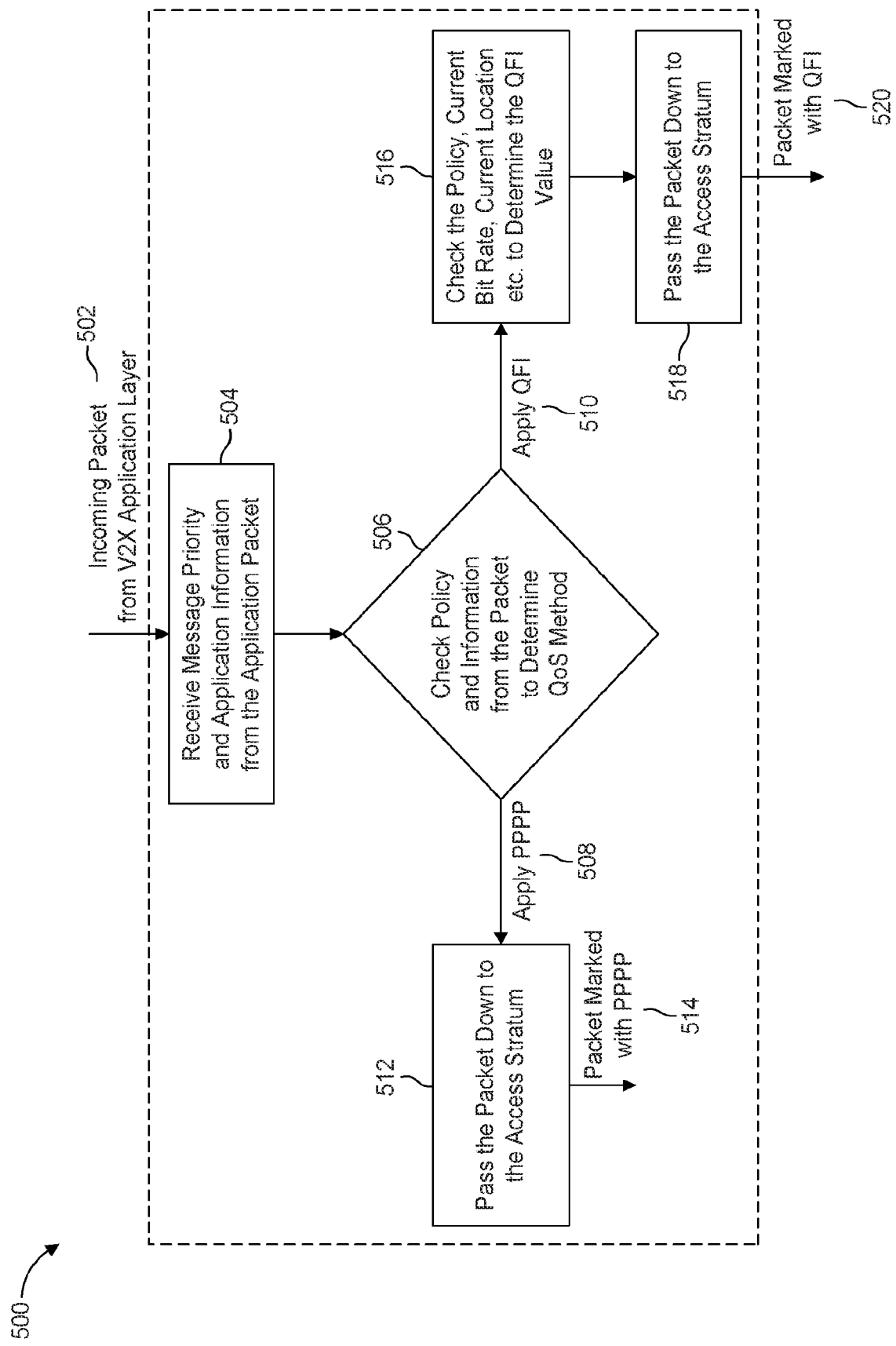
FIG. 5 is a flow diagram illustrating an example procedure to determine the quality of service (QoS) method used by the WTRU on a per uplink (UL) packet basis.

FIG. 5 is a flow diagram illustrating an example procedure 500 to determine the QoS mechanism used by the WTRU on a per UL packet basis. The procedure may be performed at one or more higher layers of the WTRU to determine the QoS mechanism and, subsequently, the corresponding QFI value used by the WTRU on a per UL packet basis. As shown in FIG. 5, an incoming packet may be received 502 from a V2X application layer. The packet may be processed to determine 504 a message priority and any other application information which may aid in determining a QoS mechanism. With this information, the WTRU may, according to a policy, determine 506 the QoS mechanism. The policy may indicate two or more outcomes, including an applicability 508 of PPPP or an applicability 510 of QFI. PPPP may be applicable, and the packet may be passed down 512 to the access stratum. In this case, the packet may be marked 514 with the PPPP. If the policy indicates 510 QFI, a QFI value may be determined 516. The packet may be passed 518 down to the access stratum and the packet may be marked 520 with the QFI value. The packet may be transmitted in accordance with the QoS mechanism and value.

Figure 6:
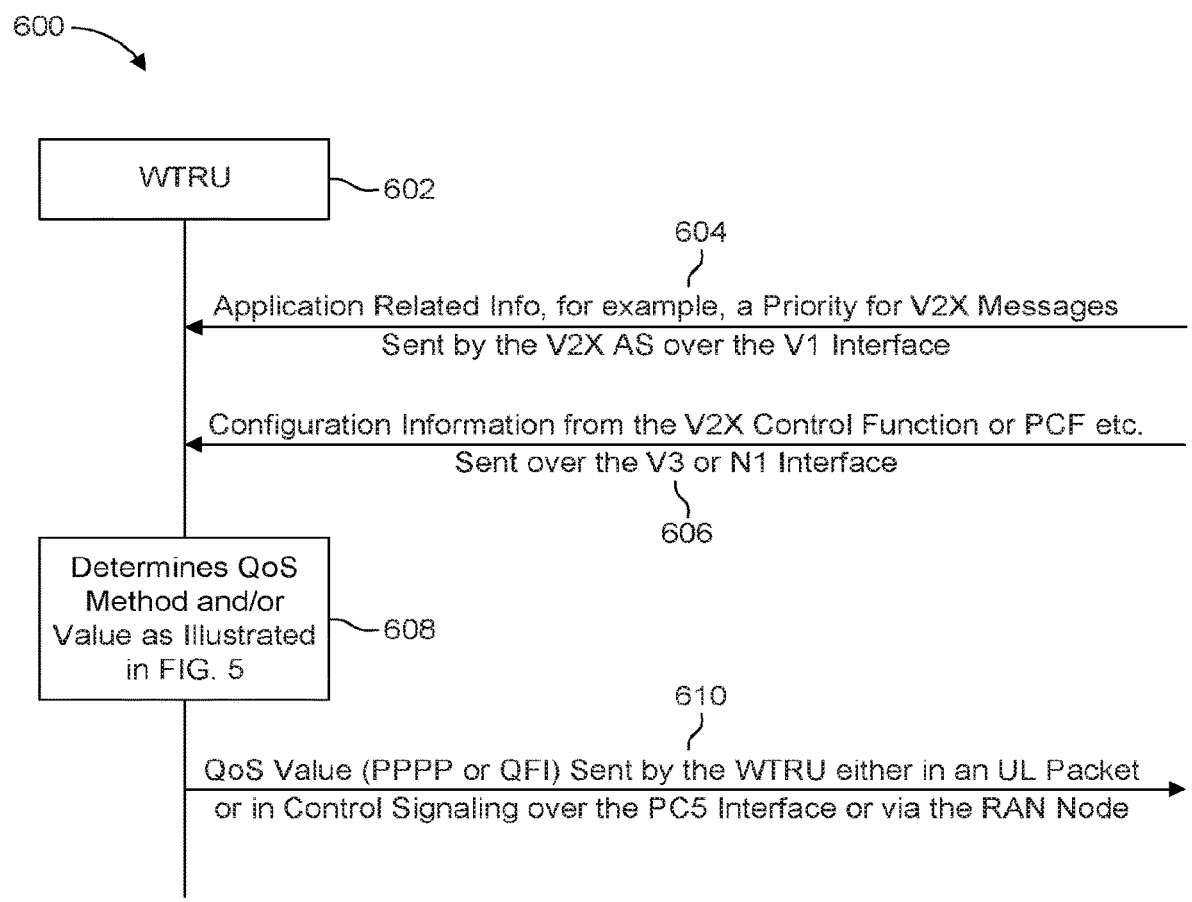
FIG. 6 is a flow diagram illustrating an example general procedure to determine the QoS mechanism used by the WTRU.

FIG. 6 is a flow diagram illustrating a procedure 600 to determine the QoS mechanism used by a WTRU 602. The example provided by FIG. 6 illustrates steps performed at the WTRU to apply the appropriate QoS mechanism for a V2X message. The procedure may be employed to determine the QoS mechanism, the QFI value or both. In an example, the application at the WTRU generating the V2X packet may receive 604 priority information regarding various V2X messages from the V2X application server over the V1 interface. Signaling over the V1 interface may consist of or may include application layer signaling. The WTRU may receive 606 configuration information from a V2X control function, PCF or the like. This information may be received over a V3 or N1 interface among others. The WTRU may determine 608 to apply a PPPP value or QFI value as was performed in FIG. 5. The WTRU may then include 610 the PPPP of QFI value in a packet for transmission. Alternatively or in combination, the WTRU may signal 610 the determined PPPP or QFI value to another WTRU over the PC5 interface or alternatively or in combination, to a RAN node such as a gNB.

The 3GPP network functions or nodes responsible for the V2X policy configuration may provide the configuration information to the WTRU as described herein. Example network functions or nodes responsible for the V2X policy configuration may include one or more of a V2X control function, a ProSe function, a PCF, an AMF, a SMF and the like. The WTRU may receive such configuration information over a V3, N1 or other interface.

Once the UL V2X packet arrives at a higher layer of the WTRU, the QoS mechanism and the corresponding value may be determined as per the procedure illustrated in FIG. 5. The V2X packet may then be passed down to lower layers of the WTRU. The lower layers may then send the QoS value, PPPP or QFI, over the air either on a PC5 channel or over an Uu interface depending on the WTRU mode of transmission. The QoS value may either be sent in the data packet or over the air control signaling.

In examples, 5GS V2X capable WTRUs may support and apply reflective QoS functionality. During the PC5 link establishment procedure, one or more WTRUs may indicate support for reflective QoS functionality. The network may also be aware of the reflective QoS functionality of the WTRUs. This functionality may be indicated to the network during an attach procedure or another procedure. In one embodiment, the indication may be provided via a capability identifier.

In examples, V2X capable WTRUs may support three different types of traffic, specifically: broadcast, multicast and unicast. For unicast and multicast traffic, there may be scenarios where a WTRU may need to apply reflective QoS. For example, this need may be due to the fact that each WTRU of the multicast group is applying reflective QoS or that a requestor has requested reflective feedback be applied.

Figure 7:
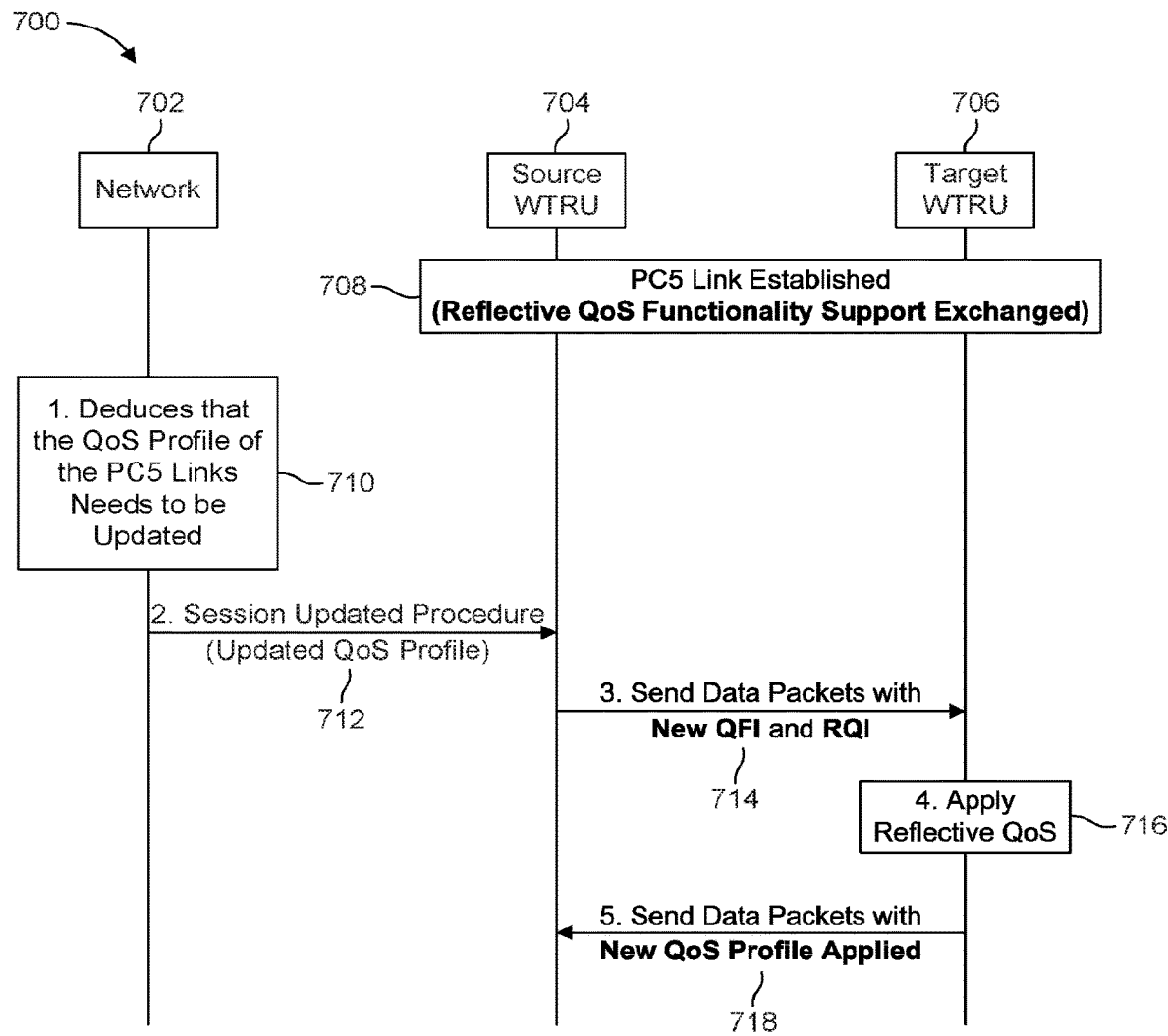
FIG. 7 is a flow diagram illustrating an example procedure to apply a reflective QoS mechanism for a unicast PC5 link.

FIG. 7 is a flow diagram illustrating an example procedure 700 for applying a reflective QoS mechanism for a unicast PC5 link. FIG. 7 illustrates a network 702, source WTRU 704 and target WTRU 706. A PC5 link may be established 708 between the source WTRU 704 and the target WTRU 706. At the time of link establishment or at a point in time thereafter, a support indication of reflective functionality may be exchanged, for example, via a capability indicator or indication sent over the PC5 link. For a unicast PC5 link, the network may determine 710 that the QoS profile is to be changed or updated. The change may be for various reasons, such as a change in geographic area, change in subscriber information or the like. A source WTRU 704 may be notified 712 by the network 702 that there is a need for a change in the QoS profile. This notification may be sent or performed via a Session Update procedure or message. The session updated procedure may include an updated QoS profile for use by the source WTRU 704. On receiving the indication 712 from the network 702, the source WTRU 704 may send 714 data packets to the target WTRU 706 with an updated QFI and the reflective QoS indication (RQI). Upon reception 714 of the RQI, the target WTRU 706 may apply 716 reflective QoS in accordance with the RQI. The reflective QoS may be a same QFI/5QI or vehicle quality indicator (VQI) that was received on the downlink and may be applied by the target WTRU for the corresponding UL packet. Further, the target WTRU 706 may derive QoS rules for traffic that will be sent to the source WTRU 704. Accordingly, the target WTRU 706 may then transmit 718 data packets applying a new QoS profile.

In a unicast scenario, the role of the source WTRU and the target WTRU may be interchanged once the PC5 link is established. An implication of interchangeable roles may include that whenever the target WTRU, which may be context based, determines that the source WTRU includes an RQI, then the target WTRU may apply reflective QoS on the uplink.

Figure 8:
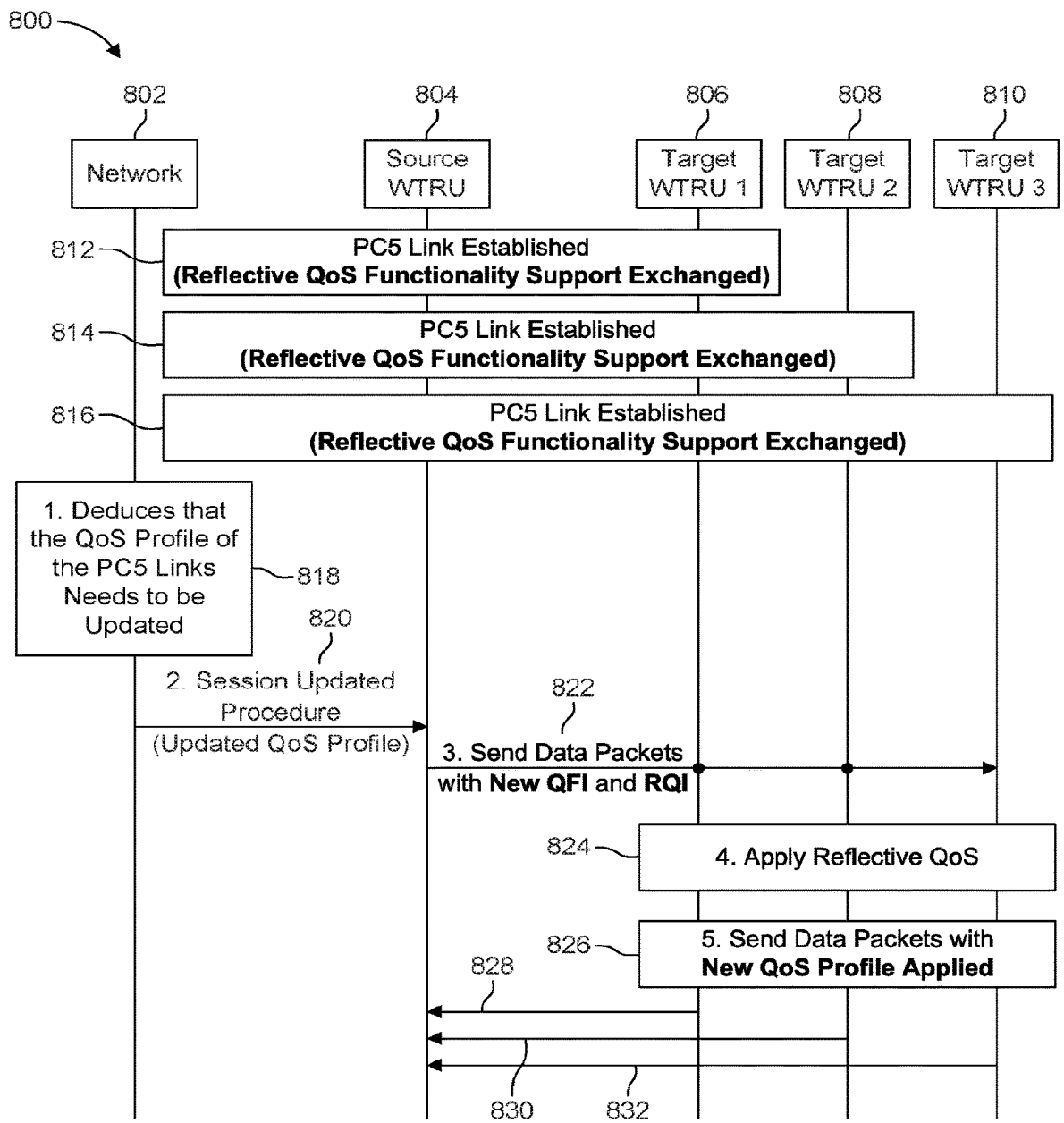
FIG. 8 is a flow diagram illustrating an example procedure to apply a reflective QoS mechanism for a multicast PC5 link.

FIG. 8 is a flow diagram illustrating an example procedure 800 used to apply a reflective QoS mechanism for a multicast PC5 link. In this example procedure, a multicast PC5 link may be established between a source WTRU 804 and three target WTRUs, target WTRU 1 806, target WTRU 2 808 and target WTRU 3 810. A capability to support the enablement of reflective QoS during a PC5 connection establishment procedure may be exchanged among the WTRUs 804-810. Each exchange 812-816 may be performed between the source WTRU 804 and each of the plurality of target WTRUs 806-810. The network may deduce 818 or determine that the QoS profile of a plurality of PC5 links, i.e. the links which encompass the multicast session between source WTRU and target WTRUs, needs to be changed or updated. This need for change may be signaled 820 by the network to the source WTRU and signaled 822 from the source WTRU 804 to the plurality of target WTRUs 806-810 via a session updated procedure. When all the WTRUs in the unicast/multicast link agree to use reflective QoS, the source WTRU 804 may not have to explicitly include RQI in the data packet as described in FIG. 7. In this example, it may be implicitly known to the WTRUs participating in the PC5 communication that reflective QoS is enabled. The implicit enablement may mean that the WTRU may always apply 824 reflective QoS in the UL direction based on the received QFI of the downlink packet. In this way, new data packets 828-832 sent by the target WTRUs 806-810 to the source WTRU 804 may have the new QoS profile applied 826 which includes reflective QoS.

In an example, the WTRUs in such a procedure may only follow the QoS for one of the WTRUs, for example, a leader WTRU. The WTRUs may decide during the PC5 establishment upon a leader WTRU, whose QoS or QFI may be used in the UL direction by the other WTRUs during PC5 communication. In a further example, the leader WTRU may only include the QFI or QoS value in the packet when or whenever the lead WTRU indicates a change of QoS that is applied by the other WTRUs participating in PC5 communication in the UL direction.

The multicast links may be treated as a special case of a unicast link and as such, the same steps mentioned above may be applied to a multicast scenario. A particular use case may include enhanced V2X (eV2X) vehicle platooning. In such case, the platoon leader may indicate the changes in the QoS profile to all of the target WTRUs. Upon receiving the indication, the target WTRUs may apply reflective QoS and may derive QoS rules based on the downlink traffic that is received from the source WTRU. In this case, the session updated procedure may indicate that the platoon leader has changed or that group members may join or leave the platoon.

As with its unicast counterparts, the source WTRU and the target WTRU may be interchangeable in a multicast case as well. However, unless the WTRU has one-to-many links, the network may include the RQI in the downlink and the new QFI may be restricted exclusively to that specific PC5 link. If the WTRU has one-to-many links, the network may include the RQI in the downlink and the new QFI may be applied to all the links on the uplink.

Figure 9:
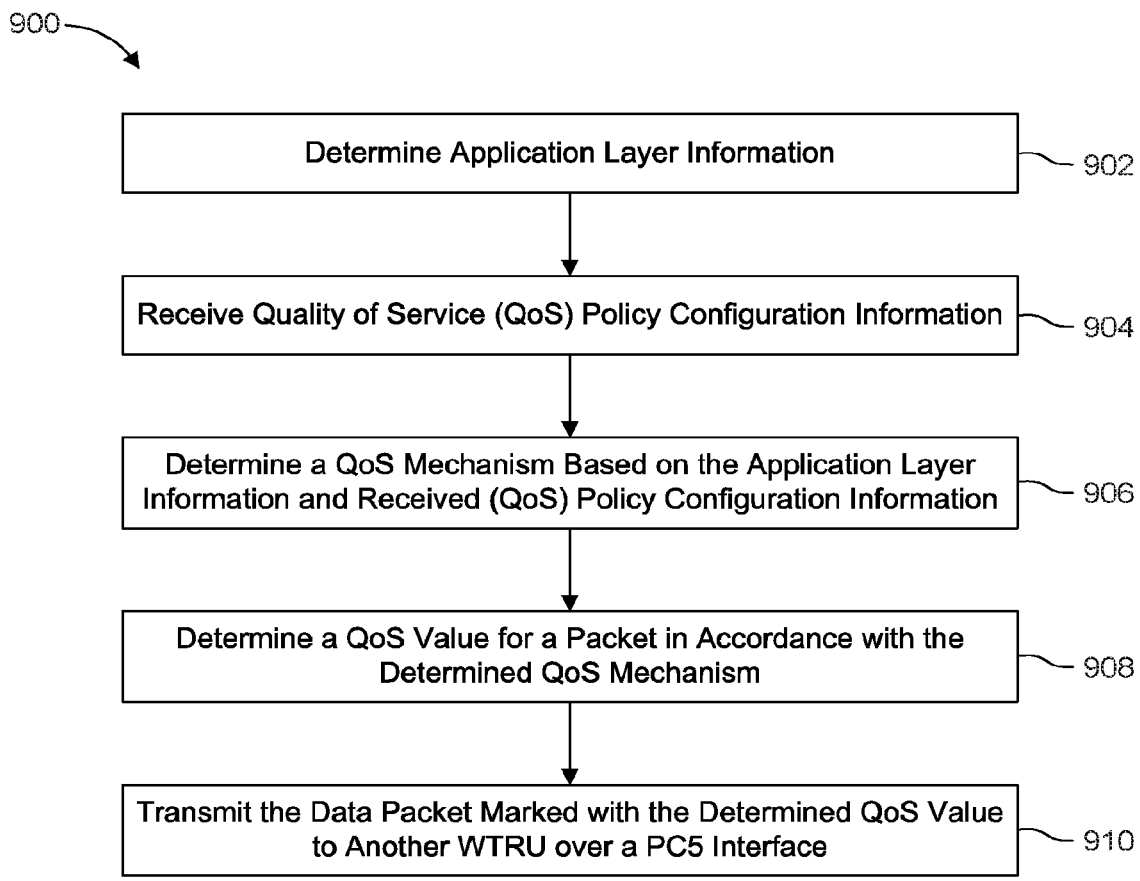
FIG. 9 is a flow diagram illustrating an example method for transmitting a data packet marked with an appropriate QoS value.

FIG. 9 is a flow diagram 900 illustrating an example method for transmitting a data packet marked with an appropriate QoS value. A WTRU may determine 902 application layer information and receive 904 information of a QoS policy configuration. The application layer information may be one or more of an application identifier, a PSID, an ITS-AID, a priority level, a PDB and may also include latency information of the application or traffic. The WTRU may determine 906 a QoS mechanism, for example, either PPPP or QFI, based on the application layer and the received QoS policy configuration information. PPPP may employ 8 different priority levels. Once the QoS mechanism is determined 906, a QoS value for a packet may be determined 908 in accordance with the QoS mechanism. PPPP values may be in the range of 1-8, which QFI values may be more granular. The data packet may then be marked with the determined QoS value and transmitted 910 to another WTRU over a PC5 or other interface.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising a processor and memory, the processor and memory configured to:
   determine application layer information associated with a vehicle-to-everything (V2X) service;
   receive quality of service (QOS) policy configuration information from a network, wherein the QoS policy configuration information comprises a mapping of a V2X identifier associated with the V2X service to at least one flow based QoS parameter;
   apply a per-flow based QoS mechanism for device-to-device communications for the V2X service in accordance with the at least one flow based QoS parameter associated with the V2X identifier associated with the V2X service; and
   transmit information indicative of the at least one flow based QoS parameter to a radio access network.

2. The WTRU of claim 1, wherein the at least one flow based Qos parameter comprises at least one of a packet delay budget (PDB), a packet error rate (PER), or a priority.

3. The WTRU of claim 1, wherein the V2X identifier is associated with a geographic area.

4. The WTRU of claim 1, wherein the per-flow based QoS mechanism for device-to-device communications for the V2X service is applied, based at least in part, on a geographic location of the WTRU.

5. The WTRU of claim 1, wherein the QoS policy configuration information is received via a next generation Node B (gNB).

6. The WTRU of claim 1, the processor and memory further configured to transmit the information indicative of the at least one flow based QoS parameter over a PC5 interface.

7. A method performed by a wireless transmit/receive unit (WTRU), the method comprising:
   determining application layer information associated with a vehicle-to-everything (V2X) service;
   receiving quality of service (QOS) policy configuration information from a network, wherein the QoS policy configuration information comprises a a mapping of a V2X identifier associated with the V2X service to at least one flow based QoS parameter associated with the service; and
   applying a per-flow based QoS mechanism for device-to-device communications for the V2X service in accordance with the at least one flow based QoS parameter associated with the V2X identifier associated with the V2X service;
   and transmitting information indicative of the at least one flow based QoS parameter to a radio access network.

8. The method of claim 7, wherein the at least one flow based QoS parameter comprises at least one of a packet delay budget (PDB), a packet error rate (PER), or a priority.

9. The method of claim 7, wherein the V2X identifier is associated with a geographic area.

10. The method of claim 7, wherein applying the per-flow based QoS mechanism for device-to-device communications for the V2X service is based at least in part, on a geographic location of the WTRU.

11. The method of claim 7, wherein the QoS policy configuration information is received via a next generation Node B (gNB).

12. The method of claim 7, further comprising transmitting the information indicative of the at least one flow based QoS parameter over a PC5 interface.

* * * * *

UNITED STATES PATENT AND TRADEMARK OFFICE
CERTIFICATE OF CORRECTION

PATENT NO. : 12,238,586 B2
APPLICATION NO. : 17/962876
DATED : February 25, 2025
INVENTOR(S) : Saad Ahmad and Khalid Anwar Page 1 of 1

It is certified that error appears in the above-identified patent and that said Letters Patent is hereby corrected as shown below:

In the Claims

In Claim 7: Column 22, Line 16, delete "configuration information comprises a a mapping of a" and insert -- configuration information comprises a mapping of a --.

Signed and Sealed this
Third Day of June, 2025

Coke Morgan Stewart
*Acting Director of the United States Patent and Trademark Office*